United States Patent [19]
Rushing et al.

[11] Patent Number: 5,546,165
[45] Date of Patent: Aug. 13, 1996

[54] SCANNER AS TEST PRINT DENSITOMETER FOR COMPENSATING OVERALL PROCESS DRIFT AND NONUNIFORMITY

[75] Inventors: Allen J. Rushing, Webster; Yee S. Ng, Fairport, both of N.Y.

[73] Assignee: Eastman Kodak Company, Rochester, N.Y.

[21] Appl. No.: 318,396

[22] Filed: Oct. 5, 1994

[51] Int. Cl.⁶ .................................................. G03G 21/00
[52] U.S. Cl. .......................... 355/208; 355/210; 358/298; 358/448; 358/455; 358/456
[58] Field of Search ..................................... 355/203, 204, 355/205, 207, 208, 210, 233, 246, 326 R; 358/298, 300, 448, 455, 456, 474; 347/15, 142, 143, 144, 237, 239

[56] References Cited

U.S. PATENT DOCUMENTS

| | | | |
|---|---|---|---|
| 3,914,047 | 10/1975 | Hunt et al. | 355/212 |
| 4,547,811 | 10/1985 | Ochi et al. | 358/455 |
| 4,710,785 | 12/1987 | Mills | 355/208 |
| 5,172,248 | 12/1992 | Urabe et al. | 358/456 |
| 5,200,765 | 4/1993 | Tai | 347/240 |
| 5,223,952 | 6/1993 | Anzai | 358/274 X |
| 5,241,347 | 8/1993 | Kodama | 355/246 |
| 5,253,934 | 10/1993 | Potucek et al. | 347/237 |
| 5,257,039 | 10/1993 | Chung et al. | 347/237 |
| 5,300,960 | 5/1994 | Pham et al. | 347/130 |
| 5,309,177 | 5/1994 | Shoji et al. | 358/298 X |
| 5,313,309 | 5/1994 | Tai et al. | 358/455 |
| 5,323,179 | 6/1994 | Sanger et al. | 347/237 |
| 5,408,329 | 4/1995 | Mailloux et al. | 358/298 |

OTHER PUBLICATIONS

U.S. application Ser. No. 08/175,079, filed Dec. 29, 1993 to Isaac I. Ajewole.
U.S. application Ser. No. 07/807,522, filed Dec. 13, 1991 to E. Michael Kelly et al.

*Primary Examiner*—Sandra L. Brase
*Attorney, Agent, or Firm*—Norman Rushefsky

[57] ABSTRACT

An electrostatographic copier or copier/printer apparatus and method for calibrating same with an improved means for adjusting for process control parameters is described. The apparatus includes a scanner for scanning an original document to be copied and for generating signals representing a density characteristic of images on the document. An electronic writer responsive to scanned signals modulates charge on an electrostatographic recording member to form a latent electrostatic image. The latent image is developed and transferred to a record member. Them are provided further means responsive to rescanning of the record member by the scanner for generating adjustment signals for correcting for calibration errors in processing of an image, and the writer is responsive to the adjustment signals. The writer may thereby correct for nonuniformities in a direction transverse to said process direction. In a further calibration step, there are generated adjustment signals that are responsive to scanning by the scanner of a halftone step tablet on a record member. The adjustment signals are used to generate adjusted halftone rendering patterns for printing by the writer. In a further calibration step, calibration errors in a reproduction process are determined by scanning of a contone step pattern and adjustment signals are generated for modifying data for generating exposure clock signals which are determined for scanning of a contone step pattern and which control exposure time durations of the writer.

17 Claims, 8 Drawing Sheets

| GAMMA CORRECTION LUT | |
|---|---|
| SCANNER LEVEL NO. | HALFTONE PATTERN NO. |
| 0 | 1 |
| 1 | 1 |
| 2 | 1 |
| ⋮ | ⋮ |
| 110 | 32→34 |
| ⋮ | ⋮ |
| 200 | 49→47 |
| ⋮ | ⋮ |
| 254 | 60 |
| 255 | 60 |

FIG. 10

SCANNER AS TEST PRINT DENSITOMETER FOR COMPENSATING OVERALL PROCESS DRIFT AND NONUNIFORMITY

BACKGROUND OF THE INVENTION

1. Field of the Invention

The present invention relates to electrostatographic copiers and or copier/printers and more particularly, to methods and apparatus for providing improved density consistency and uniformity in such copiers or copier/printers.

2. Description Relative to the Prior Art

In the prior art as presented by U.S. Pat. No. 4,710,785, it is known to provide an electrostatographic copier machine with adjustable process control parameters wherein image contrast, density and color balance can be adjusted. The process control parameters considered adjustable are initial charge $V_o$, exposure $E_o$ and developer bias.

In order to control the quality of the apparatus, the referenced patent discloses the production of a test print and the scanning of the test print by the copier scanner. The scanned data of the test print is compared to a signal stored in memory regarding generation of the original. As a result of the comparison, an error signal is generated and adjustments made accordingly.

A problem associated with the above is that nonuniformities in a direction that is cross-track to the process direction cannot be well accommodated by making overall process changes. It is to this problem that the instant invention is addressed.

The invention is further directed to the problem of overcoming drift in an electrostatographic process wherein over time recalibration is required.

SUMMARY OF THE INVENTION

Accordingly, it is an object of the present invention to provide an electrostatographic copier or copier/printer and method for calibrating same with an improved means for adjusting for process control parameters. It is a further object of the invention to provide an electrostatographic copier or copier/printer with improved means for adjusting parameters requiring adjustment in a direction cross-track to a process direction.

In accordance with one aspect of the present invention, there is provided an electrostatographic reproduction apparatus comprising scanner means for scanning an original document to be copied and for generating signals representing a density characteristic of images on said document; an electrostatic recording member movable in a process direction; writer means responsive to said scanned signals for modulating charge on said member to form a latent electrostatic image; means for developing the latent image; means for transferring a developed image to a record member; and means responsive to rescanning of the record member by the scanner means for generating adjustment signals for correcting for calibration errors in processing of an image, and said writer means being responsive to said adjustment signals.

In accordance with a further aspect of the invention, there is provided an electrostatographic reproduction method comprising scanning an original document to be copied with an electronic scanner and generating signals representing a density characteristic of images on said document; an electrostatic recording member movable in a process direction; modulating charge on an electrostatic recording member by selectively enabling an electronic writer to form a latent electrostatic image; developing the latent image; transferring a developed image to a record member; and rescanning the record member by the scanner and generating adjustment signals, and in response to said adjustment signals modifying signals to said writer to correct for nonuniformities in a direction transverse to said process direction.

In accordance with still a further aspect of the invention, there is provided an electrostatographic reproduction apparatus comprising scanner means for scanning an original document to be copied and for generating signals representing a density characteristic of images on said document; an electrostatic recording member movable in a process direction; writer means responsive to said scanned signals for modulating charge on said member to form a latent electrostatic image; means for developing the latent image; means for transferring a developed image to a record member; and means responsive to rescanning of the record member by the scanner means for generating adjustment signals in response to scanning by said scanner means of a halftone step tablet on said record member for use in generating adjusted halftone rendering patterns by said writer means.

In accordance with yet another aspect of the invention, there is provided an electrostatographic reproduction apparatus for reproducing copies, the apparatus comprising scanner means for scanning an original document to be copied and for generating signals representing a density characteristic of images on said document; an electrostatic recording member movable in a process direction; writer means responsive to said scanned signals for modulating charge on said member to form a latent electrostatic image; means for developing the latent image; means for transferring a developed image to a record member; and means responsive to rescanning of the record member by the scanner means for generating adjustment signals for correcting for calibration errors in a reproduction process said adjustment signals represents data for generating exposure clock signals and means responsive to said exposure clock signals for controlling exposure time durations of said writer means.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENTS

Because electrostatographic apparatus of the type described herein are well known, the present description will be directed in particular to elements forming part of or cooperating more directly with the present invention.

Figure 1:
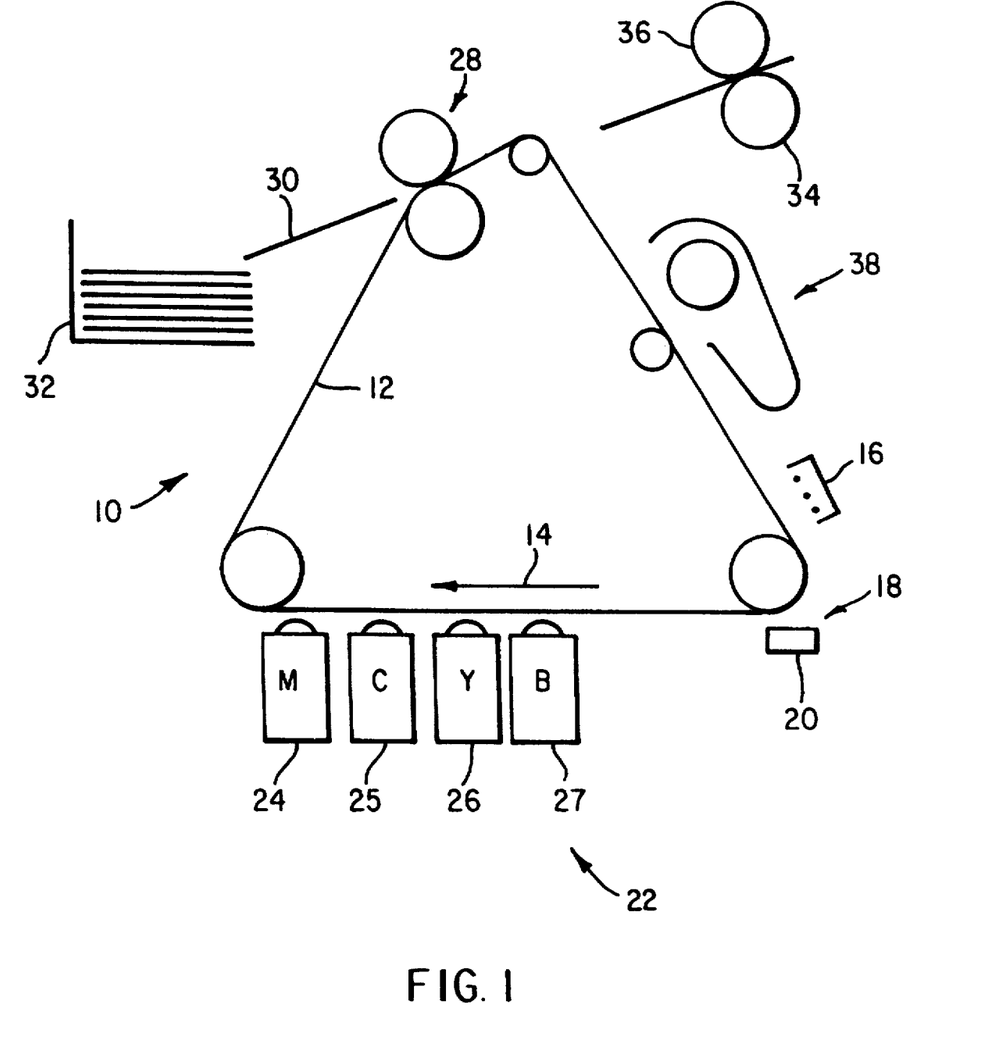
FIG. 1 is a schematic side elevational view of an electrostatographic apparatus suitable for use in the present invention.

Referring to FIG. 1, an electrostatographic machine 10 has an image transfer member such as photoconductive belt 12. Belt 12 is moved in a clockwise direction, as represented by arrow 14.

A charging station 16 applies a uniform electrostatic charge to belt 12. At an exposure station 18, projected light from a write head 20 dissipates the electrostatic charge on the photoconductive belt to form a latent electrostatic image corresponding to the image of an original to be copied or printed. Write head 20 preferably has an array of light-emitting diodes (LEDs) for exposing the photoconductive belt.

The latent electrostatic image on belt 12 is developed with toner at a developer station 22. The developer station is illustrated as having four separate substations 24, 25, 26 and 27 for processing color images; the substations containing magenta, cyan, yellow, and black toner, respectively. Although four-color capability is illustrated, the present invention is applicable to monochromatic images also.

As the toner image on belt 12 approaches a transfer station 28, an image receiver sheet 30 is fed from a supply 32. After transfer of the toner image to the receiver sheet, the receiver sheet is passed through a pair of heated fuser rollers 34 and 36. Mechanical and electrical cleaning of belt 12 is effected at a cleaning station 38.

IMAGE INFORMATION SOURCE

Figure 2:
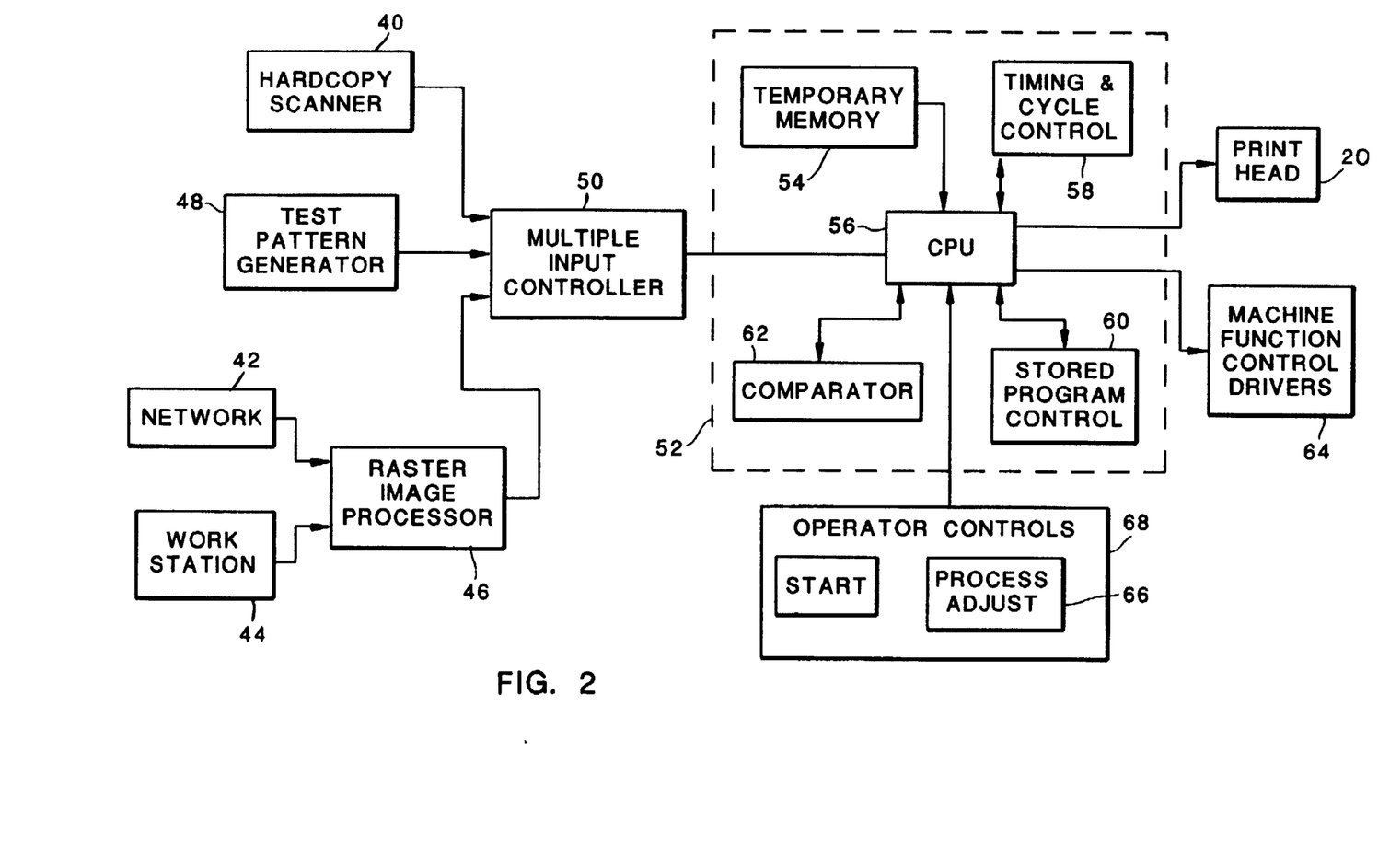
FIG. 2 is a block diagram of elements associated with the apparatus shown in FIG. 1.

Referring to FIG. 2, electrostatographic machine 10 may receive electrical image information signals in any one of several ways. For example, a document scanner 40 optically scans hard copy originals and converts the image to a rasterized electrical signal. Image information may also be obtained from electrical rather than optical sources. That is, electrical image information signals may originate (in so far as electrostatographic machine 10 is concerned) from a computer network 42 or a work station 44. Electrical image information signals from network or work station is rasterized by a raster image processor (RIP) 46. Image information may also come from a test pattern generator 48, to be explained in further detail below. The image signals are applied to write head 20 by a multiple input controller 50 under control of a logic and control unit (LCU) 52.

LOGIC AND CONTROL UNIT (LCU)

Programming of a number of commercially available microprocessors is a conventional skill well understood in the art. The following disclosure is written to enable a programmer having ordinary skill in the art to produce an appropriate control program for a microprocessor. The particular details of any such program would, of course, depend on the architecture of the designated microprocessor.

Referring still to FIG. 2, LCU 52 comprises temporary data storage memory 54, a central processing unit (CPU) 56, a timing and cycle control unit 58, a stored program control 60, and a data comparator 62. Temporary data storage memory 54 may be conveniently provided by a conventional Read/Write memory or Random Access Memory (RAM). Stored program control 60 includes one or more conventional Read Only Memories (ROM) containing operational programs in the form of binary words corresponding to instructions and values. The programs stored in ROM are responsive to various input signals for sequentially actuating and deactuating the work stations described above with reference to FIG. 1, as well as for controlling the operation of many other machine functions by means of control drivers 64, as disclosed in U.S. Pat. No. 3,914,047.

Figure 3:
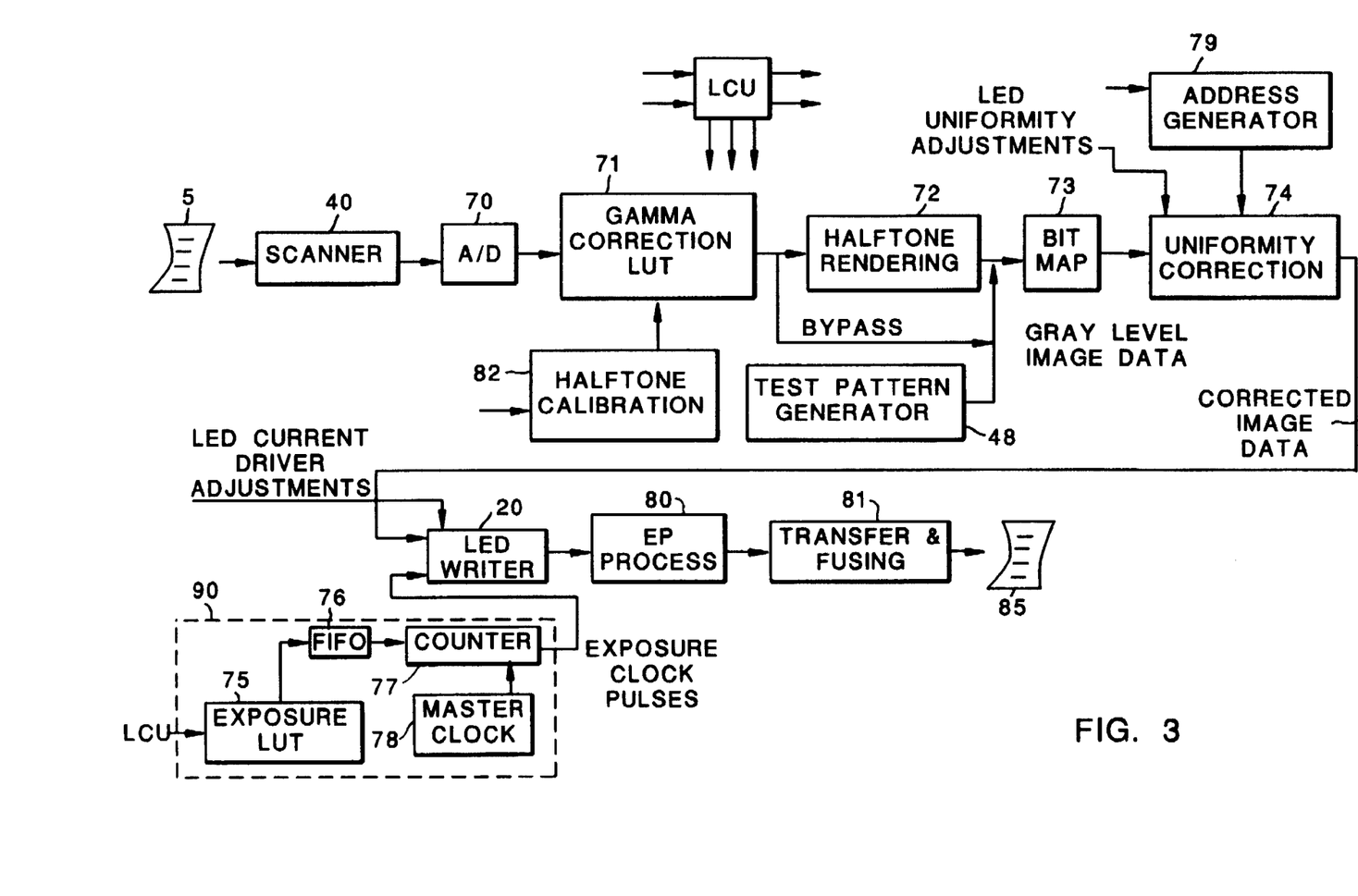
FIG. 3 is a block diagram of printer control elements and other elements used in the apparatus of FIG. 1.

With reference now to FIG. 3, the scanner 20 and LED writer has controls which may be represented by the block diagram shown therein. The document scanner 20 may comprise a set of CCD arrays arranged linearly across a direction of relative movement of a document original. In this example, assume that the scanner array can scan at 300 dots per inch (dpi) resolution both in the cross-track and in-track directions and the LED printer can print at 600 dpi resolution both in-track and cross-track. Of course, these numbers are just exemplary and other combinations of scanner and printer resolution are possible including identical resolution capability.

In operation, the scanner includes means for moving a document original 5 relative to the scanner and for generating pixel data represented by 8-bits of digital data per pixel scanned. Typically, what occurs is that analog signals generated by the scanner are converted or quantized by an A/D converter to an 8-bit signal representing 256 values between 0 and 255. A gamma correction look-up table 71 is entered with the 8-bit signal from the scanner to correct for nonlinearities in the electrophotographic process 80. Thus, in operation of the gamma correction LUT, an 8-bit image data signal input thereto representing density of a current scanned pixel is transformed into a 6-bit number that is used to identify a 2-bit x 2-bit printed halftone pattern wherein there may be provided, say, 60 halftone patterns representing halftone patterns of increasing density that are available for selection. A halftone pattern number represents an identification of a super pixel formed of, in this example, 4 printed neighboring pixel locations that are used to render the scanned pixel. The individual pixels in a super pixel are comprised of various combinations of 0 to 15 grey levels for each printed pixel in the superpixel.

In response to the identification of the halftone pattern number which is output from LUT 71, a halftone renderer 72 then outputs a grey level signal of 4-bits for each of the four pixels in that superpixel and a bit map memory array 73 stores the signals in a proper order for retrieval upon printing. When a page of memory is filled representing the data on document 5 and a next image frame is to be printed, data is removed from the bit map memory and individual pixels subject to correction for nonuniformity in accordance with a process described in U.S. Pat. Nos. 5,300,960, 5,200,765 and U.S. application Ser. No. 08/175,079. In the course of correcting the LEDs for nonuniformities, each 4-bit signal which represents 0 to 15 different grey levels in lightness space is convened to a 6-bit digital signal representing an exposure time that when that particular LED is energized for that period of time and with a predetermined current level will provide the exposure density represented by the 4-bit grey level signal. Thus, even though there are differences in the emission characteristics of LEDs on the printhead due to differences in processing of the LEDs, the LEDs can be corrected and used to record generally uniformly through control of exposure time. The correction scheme described herein is exemplary and of course other types of correction may also be used.

In a FIFO memory 76 associated with an exposure clock 90, various values are stored to control the timing of exposure clock pulses. As noted in U.S. Pat. No. 5,300,960, exposure clock pulses may be generated by loading a counter 77 with count values. The counter counts clock pulses from a high frequency master clock 78 and when a loaded count value is reached, an exposure clock pulse is generated that is output to a counter on the LED writer 20 that counts the exposure clock pulses. A count output by a comparator on the writer is compared with the uniformity corrected 6-bit pixel data signal to control when the LED that is to record that pixel is turned on and turned off. By providing different exposure values in the FIFO memory different count values are loaded into the counter and thus different periods can be created between exposure clock pulses.

In another approach disclosed in U.S. application Ser. No. 07/807,522, a shift register is loaded with digital 1's and 0's and these are shifted out under a master clock control so that the 1's represent exposure clock pulses wherein different arrangements of the 1's and 0's provide different patterns of exposure clock pulses.

The LED writer is further characterized by the control of amount of driver current in accordance with driving circuits described in U.S. Pat. Nos. 5,257,039 and 5,253,934.

The selective activation of the LEDs to generate light modulates the electrostatic charge pattern on the belt to create a latent electrostatic image. As noted above, this image is developed with electroscopic visible toner particles as part of the electrophotographic process 80 and then transferred to a record member, such as a sheet of plain paper or other type of sheet. The transferred image is then fused in a fusing step 81 to the record member to generate a printed document 85.

The apparatus of the invention provides improved density consistency and uniformity in an electronic grey level copier/printer which has an electronic document scanner and an electronic writer. In the apparatus of the invention, special test images are delivered and then fed into the scanner. The scanned data are analyzed to characterize the overall process in terms of cross-track uniformity and deviation from desired tone scale. From this characterization, three types of adjustments may be computed and applied (within the limits of scanner resolution, accuracy and registration).

1. Uniformity Adjustments

From flat field control (continuous tone) test prints, uniformity adjustments are computed and applied to the individual LED drive currents or on-times.

2. Contone Grey Level Adjustments

From contone step tablet test prints, contone grey levels are adjusted according to the deviation from the desired (usually equal lightness) contone steps, from $D_{min}$ to $D_{max}$.

3. Gamma Correction Adjustments

From halftone step tablet test prints, the gamma correction (for rendering) is recalibrated according to the deviation from the desired halftone tone scale.

Figure 4:
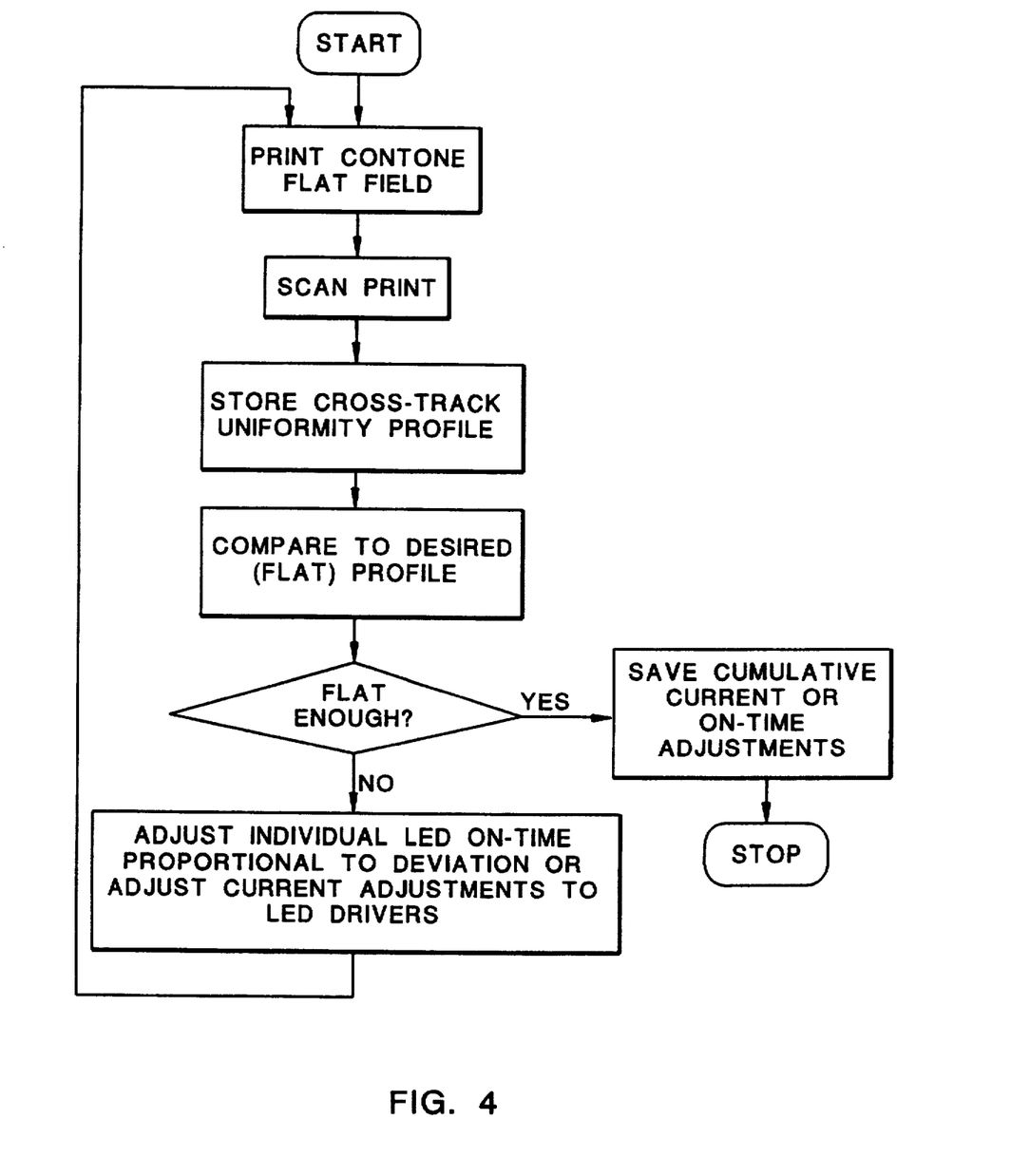
FIG. 4 is a flowchart illustrating a procedure for uniformity correction for use in calibrating the apparatus of FIG. 1.
Figure 5:
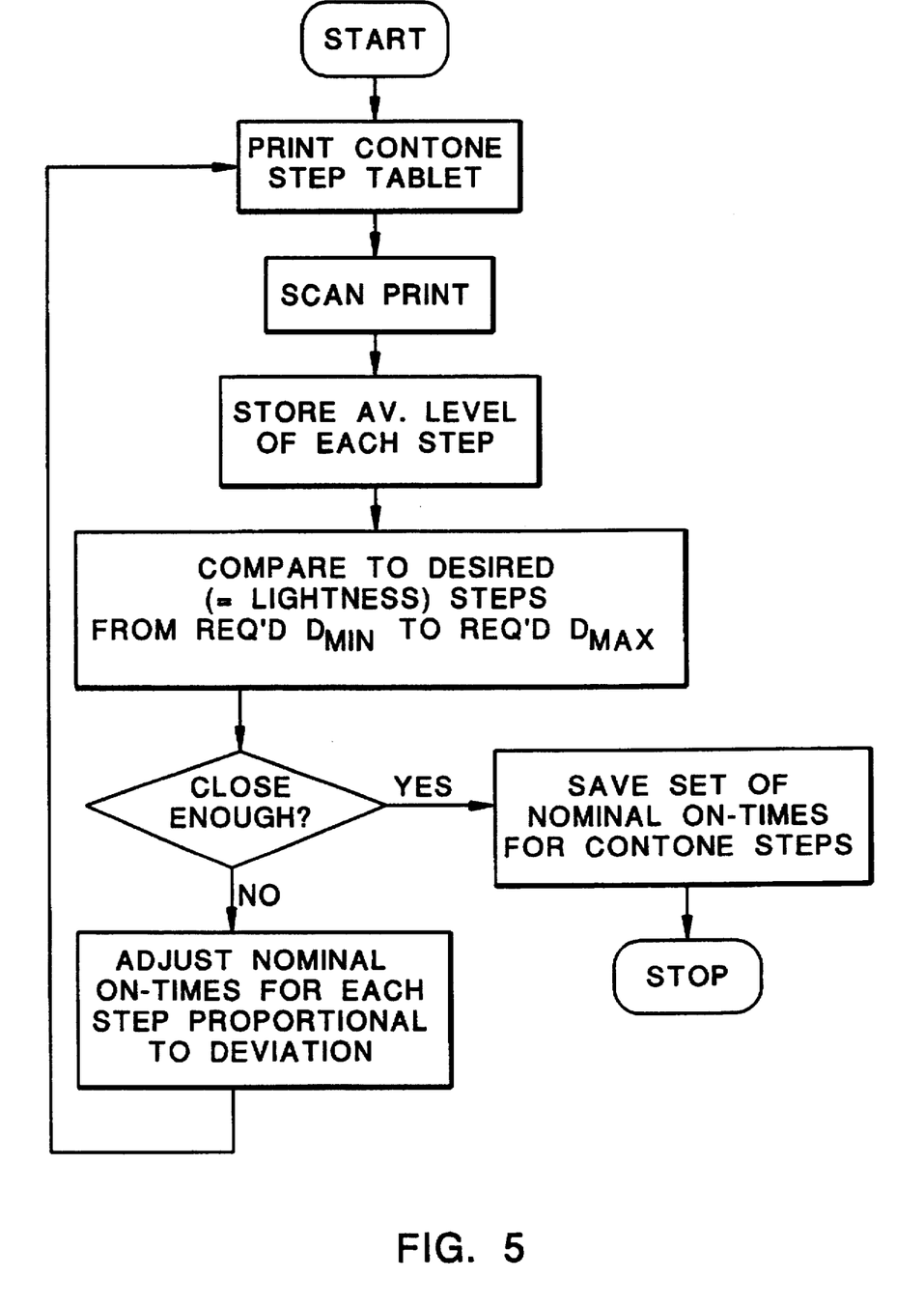
FIG. 5 is a flowchart illustrating a procedure for contone grey-level correction for use in further calibrating the apparatus of FIG. 1.
Figure 8:
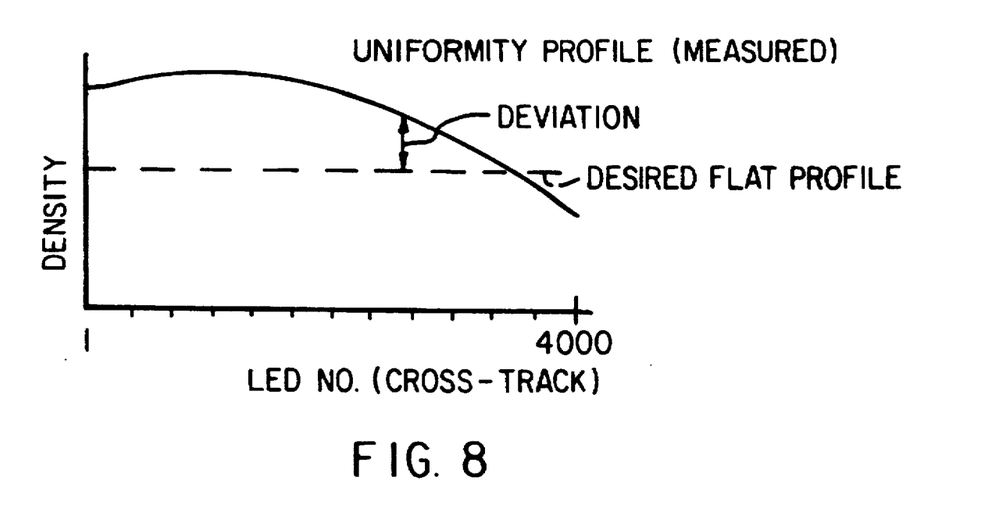
FIG. 8 is a graph illustrating density vs. LED position in the cross-track direction.

In order to provide uniformity adjustments the procedure set forth in the flowchart of FIG. 4 is followed. Initially, a print 85 is made using test print data stored in a memory associated with test pattern generator 48. This test print data is printed and processed to provide a flat field contone (continuous tone) print. The print is then input into the copier's scanner 40 by the operator and scanned for cross-track uniformity. As noted in FIG. 8, the cross-track density profile may fall off to one side due to z-plane skewing of the printhead, i.e., the printhead and/or Selfoc lens is not parallel to the photoconductor; or the charger or toning station is also not parallel or is contaminated. Other profiles for nonuniformity may arise due to differential aging of the LEDs. Thus, LEDs used more tend to be less efficient light emitters. In any event, where the measured cross-track density profile from the copier's scanner indicates a region of deviation of density from a desired flat profile the exposure times of LEDs used to print in that region may be adjusted through correction, so that the density recorded by these LED will be either lowered or raised. Adjustments may be made in LED on-time so that a new assignment of brightness characteristic is made to the LEDs in a region deemed to be providing either too much or too little exposure. As noted in the above-mentioned references, LEDs, when manufactured and tested in a printhead, are categorized into bins so that LEDs considered to have almost similar performance characteristics for light emission can receive similar correction signals. After adjustments are made for flatness in profile the process shown in FIG. 5 is repeated and if after one or more iterations determined to fall within a desired range of flatness, the adjusted parameters at which the LEDs operate are saved.

In lieu of or in supplement to adjusting the 6-bit image data signal to correct for the non-uniformity found in the contone test print, there may be made current adjustments to LED arrays located in areas deemed requiring adjustment. As noted in U.S. Pat. No. 5,253,934, description is provided of a driver chip for use in a printhead that allows for individual control of current to groups of LEDs supported on a same LED chip array. Thus, where a printhead or LED writer includes an assembly of linear arrays wherein each array includes say 192 LEDs and the LEDs on an array are driven say by one or two driver chips the current generated by the one or two driver chips may be adjusted to be different than that of other driver chips so as to provide adjustment for measured deviation in the contone flat field.

Figure 7:
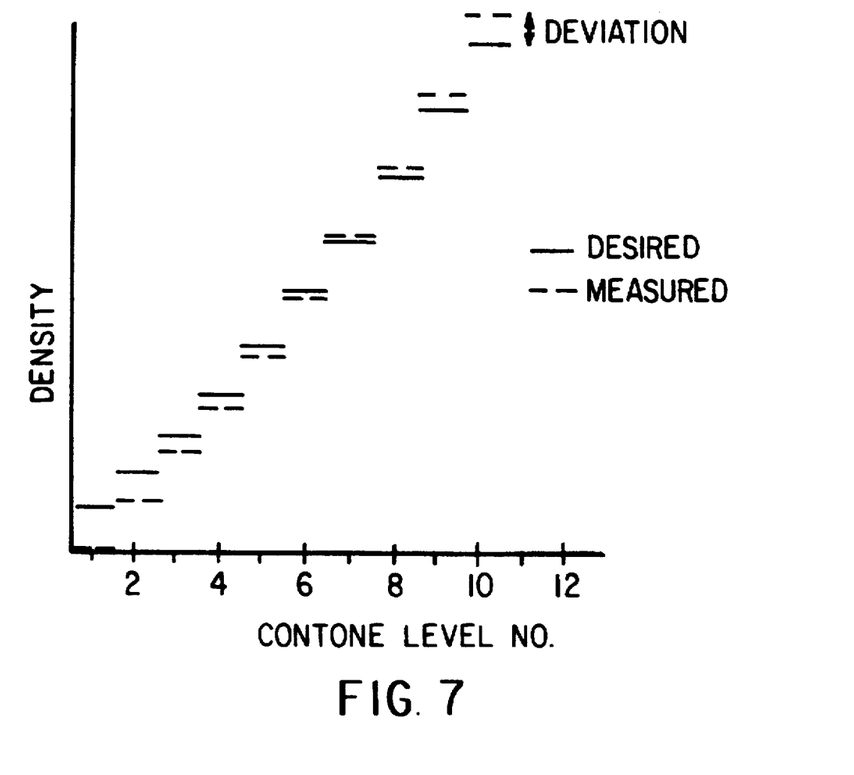
FIG. 7 is a graph illustrating density vs. contone level number.

The next test involves contone grey level adjustments. With reference to the flowchart of FIG. 5, test print data stored in memory in test pattern generator 48 is output to the printer as now adjusted with the uniformity adjustments. A test print is produced of a contone step tablet. Briefly, this involves using all the LEDs or at least a nominal segment of LEDs to print a density patch at each of the 15 levels or steps of density that the 4-bit image data system accommodates. The print with the contone density patches is then input to and read by the scanner which provides a reading of density level of each step. The read densities over each patch are averaged by the LCU and stored and then compared to desired density or lightness steps from required $D_{min}$ to $D_{max}$ (see FIG. 7). For those density steps beyond an acceptable deviation the nominal LED exposure on-time is adjusted in correspondence or proportion to the deviation. Specifically, the adjustment involves adjustments to the values placed in the clock data memory or FIFO 76 so that the set of clock data used to generate exposure clock pulses is changed. This change involves adjustment of the times between certain clock pulses so that there is thereby provided appropriate differences in exposure times during recording of different levels of grey by the same LED. Further detail regarding a non-linear clock of the type described herein may be found in U.S. Pat. No. 5,300,960. In adjusting the clock data there may be involved a recalculation of this data in the LCU or several sets of clock data may be prestored in memory such as exposure look-up table 75 and selectable by the LCU for use in adjusting clock data and thereby the clock time spacings between exposure clock pulses.

After one or more iterations of the process eventually the measured average densities of the patches will be such that they fall in a range deemed acceptably close to the desired range and the exposure clock data for use in creating these LED on-times is saved to be used for printing.

Figure 6:
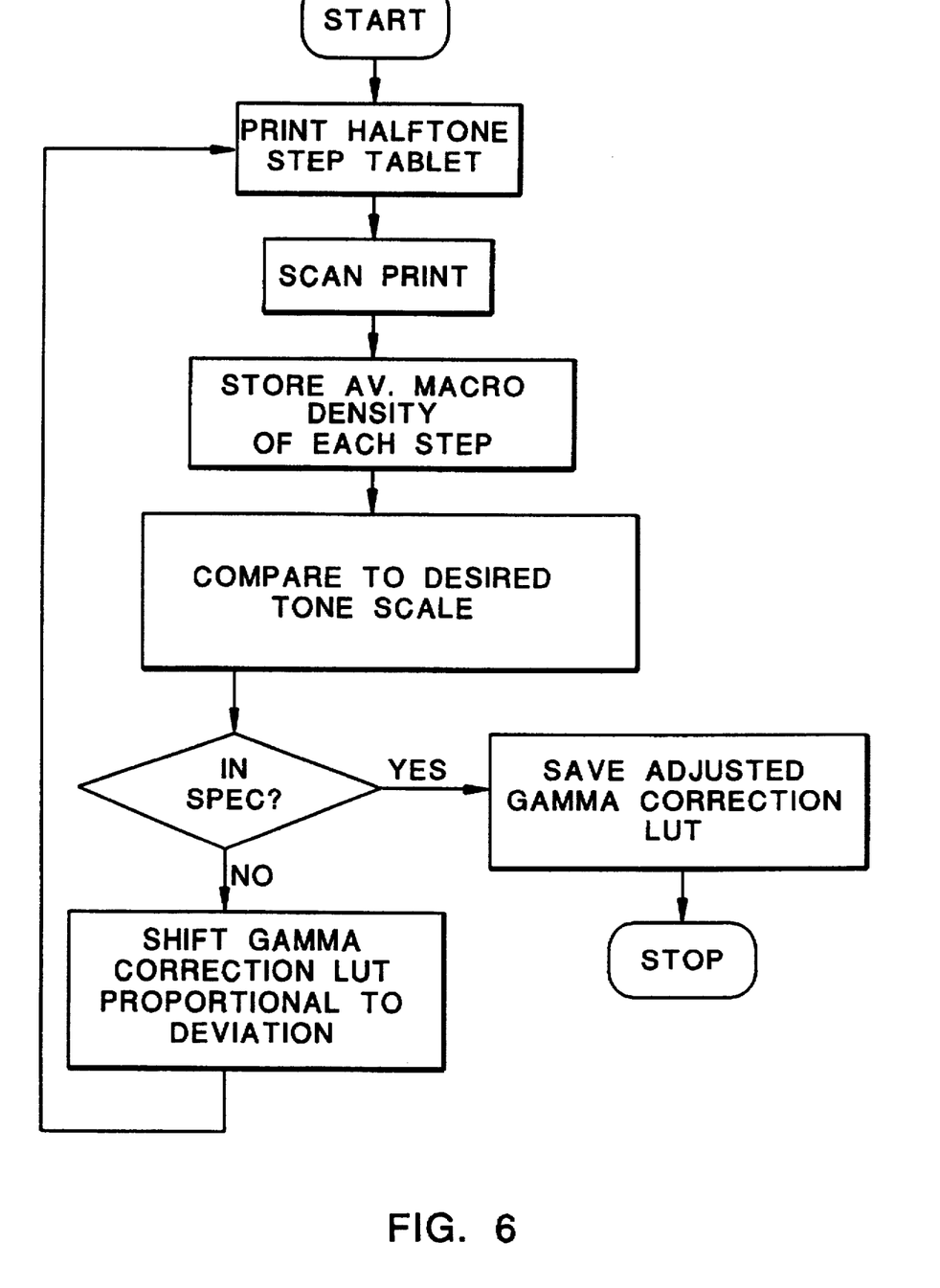
FIG. 6 is a flowchart illustrating a procedure for gamma correction for still further use in calibrating the apparatus of FIG. 1.
Figure 9:
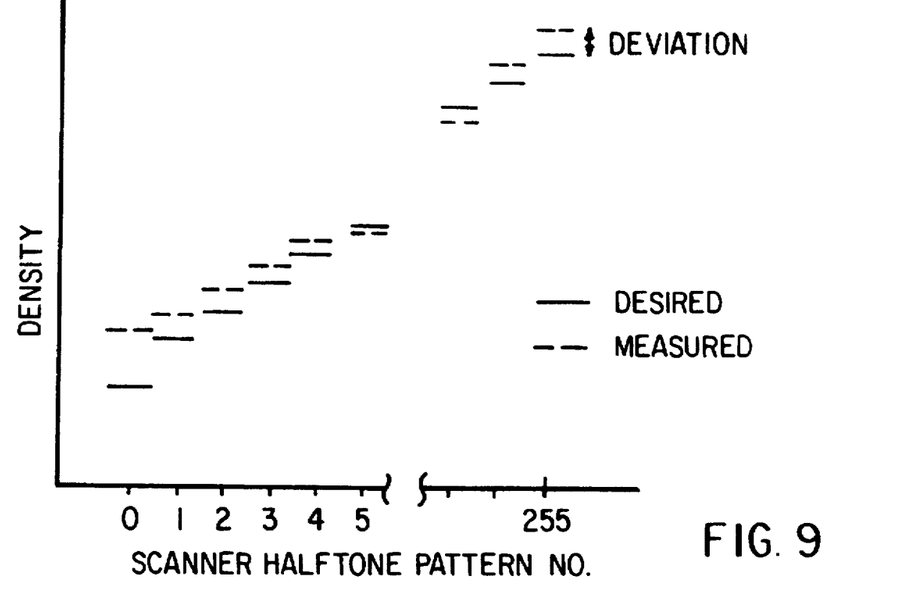
FIG. 9 is a graph illustrating density vs. scanner halftone level number.
Figure 10:
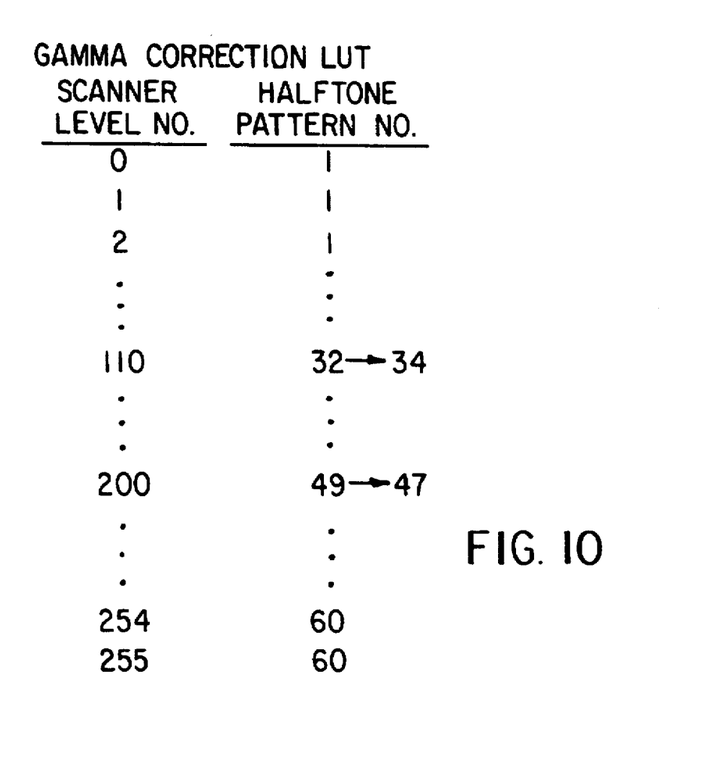
FIG. 10 is a chart which provides example of an operation of a gamma correction look-up table used in the apparatus of the invention.

With reference now to FIGS. 6 and 9, 10 in the next portion of the calibration process a halftone step tablet is printed using test print data stored in the memory of the test pattern generator 48. The resulting print represents a series of say 60 patches each formed of a halftone pattern that comprises a multiple of superpixel cells. Only a subset of the 60 halftone patterns need be printed. As noted above, each super pixel cell may comprise a plurality of printed pixels with the pixels in any cell having possibly different grey levels with some pixels not being printed at all. Halftone superpixels using a grey level printer are described in U.S. Pat. No. 5,313,309. As noted in FIGS. 9 and 10, the average scanned value of density can be quantized into 255 levels. For halftone level creation, these 255 levels may be reduced to 60 printable halftone levels.

Thus can be seen in FIG. 10 various density levels particularly at the low and high end may be assigned identical halftone pattern numbers wherein each halftone pattern represents a superpixel of a particular density. The 60 halftone pattern numbers thereby represent 60 points in the density continuum of the density versus exposure curve for printed halftone patterns.

Once the 60 halftone patches (or a subset thereof) are printed, the scanner scans the printed patches and the LCU determines and stores the average macro-density of each step. The output of the scanner can be quantized into 255 levels and each measured level is compared with a desired density level stored in memory for that halftone pattern number. If the difference is not within the desired specification range, then the gamma correction LUT will be assigned a different halftone pattern number to be printed to obtain that desired density. The process repeats itself until the measured average density for each of the printed halftone pattern numbers provides a desired density or nominal deviation considered within an acceptable range. Adjustments for the unprinted patterns of the 60 total patterns are determined by interpolation from the LUT corrections determined for the printed halftone patterns.

The adjustments may require more than one iteration for best results. The procedure may be repeated from time to time to compensate for the effects of aging, environment, module replacement, etc. Previous approaches to compensation address the deficiencies of certain individual subsystems e.g. LED writer brightness nonuniformity while other subsystems may remain uncorrected and uncompensated. The invention exploits the existing scanner of an electronic copier and the unique capabilities of an electronic imaging system compared to an optical system to accomplish overall process compensation.

In lieu of correcting for nonuniformity on an individual LED basis, the invention may be used to correct for a group of LEDs such as those driven by one or two driver chips. Correction for such LEDs may be provided as noted above by providing adjusted driver currents to the LEDs determined to be outside of the desired range of uniformity. These adjusted currents are provided preferably through adjustment signals that adjust current in a master circuit to that driver chip and to which the individual LED driver channels on the driver chip are slaved.

In order to increase accuracy of determining that a pixel scanned by the scanner is associated with a particular LED, there may be printed on the test print one or more fiduciary marks which when scanned serve to identify the LEDs that printed the marks. Through pattern recognition, the LEDs may be determined as to which LED printed which pixel. This may be used to reduce effects of paper to scanner registration. Employing relatively slow scanner paper feed rates may also assist in better sampling frequency.

The references cited herein are expressly incorporated herein by reference to supplement this disclosure of the specification. The test patterns described herein may be either stored in memory in the copier/printer as described or generated from calculations or scanned in via the scanner 40. The printer or writer is shown generally as an LED printer but other printers or writers may also be used such as laser, electrographic, etc.

The invention has been described in detail with particular reference to preferred embodiments thereof, but it will be understood that variations and modifications can be effected within the spirit and scope of the invention.

What is claimed:

1. An electrostatographic reproduction apparatus comprising:

scanner means for scanning an original document to be copied and for generating first signals representing a density characteristic of images on said document;

an electrostatic recording member movable in a process direction;

writer means responsive to said first signals for modulating charge on said member to form by use of pixels latent electrostatic images, said writer means also including means for generating using superpixels latent images of a series of halftone step patterns of different grey levels;

means for developing the latent images of the series of halftone step patterns;

means for transferring the developed images of the series of halftone step patterns to a record member;

means responsive to rescanning of the record member by the scanner means for generating adjustment signals for response to scanning by said scanner means of the series of halftone step patterns on said record member; and means responsive to said adjustment signals for generating adjustments in halftone rendering of superpixels by said writer means of first signals generated by said scanning means.

2. An electrostatographic reproduction apparatus comprising:

scanner means for scanning an original document to be copied and for generating signals representing a density characteristic of images on said document, said first signals representing density values from a first set of a first plural number of density values;

an electrostatic recording member movable in a process direction;

writer means for modulating charge on said member, said writer means including means for forming latent electrostatic images of a series of halftone step patterns of different densities, said writer means further including halftone rendering means for generating second signals representing halftone densities of superpixels to be recorded on a record member, said second signals representing density values from a second set of a second plural number of halftone density values that are fewer in number than said first plural number, the density values of said second set having a first corresponding relationship with density values from said first set;

means for developing the latent images of the series of halftone step patterns;

means for transferring developed images of the series of halftone step patterns to a record member;

means responsive to rescanning of the record member having the series of halftone step patterns by the scanner means for generating adjustment signals for correcting for conditions in processing of an image, and said halftone rendering means being responsive to said adjustment signals to produce a second corresponding relationship between the halftone density values of said second set with the density values from the first set.

3. The apparatus of claim 2 and including a test pattern generator for generating data signals representing a contone pattern; and means responsive to said data signals for printing a contone pattern on a record member.

4. The apparatus of claim 3 and wherein said writer means includes a plurality of radiation emitting recording elements and said adjustment means generates corrected multibit data signals.

5. The apparatus of claim 4 and including means responsive to scanning of a contone step pattern by said scanner means for generating corrected exposure clock pulses; and said writer means being responsive to said corrected clock pulses for generating corrected enablement times for recording.

6. The apparatus of claim 5 and including means responsive to scanning by said scanner means of a halftone step tablet for generating adjusted halftone rendering patterns.

7. The apparatus of claim 5 and including means responsive to scanning of a halftone step tablet by said scanner means for generating adjustment to a gamma correction look-up table.

8. The apparatus of claim 3 and including means responsive to scanning of a contone step pattern by said scanner means for generating corrected exposure clock pulses; and said writer means being responsive to said corrected clock pulses for generating corrected enablement times for recording.

9. The apparatus of claim 2 and including a gamma correction look-up table that generates a third signal representing a halftone pattern number for a superpixel corresponding to a density represented by said first signals; and wherein said halftone rendering means is responsive to said third signal for generating a fourth signal representing a level of density for recording a pixel in the superpixel.

10. The apparatus of claim 9 and wherein said halftone rendering means outputs a grey level signal representing multiple bits of data for each of plural pixels in the superpixel.

11. An electrostatographic reproduction method comprising:

scanning an original document to be copied and generating first signals representing density characteristics of images on said document, said first signals representing density values from a first set of a first plural number of density values;

moving an electrostatic recording member in a process direction;

operating a writer in an image copying mode wherein the writer is responsive to said first signals for modulating charge on said member, said writer being operated in said copying mode to generate second signals representing halftone densities of superpixels to be recorded on a record member, said second signals representing density values from a second set of a second plural number of halftone density values that are fewer in number than said first plural number, the density values of said second set having a first corresponding relationship with density values from said first set;

operating said writer in a calibration mode to form latent electrostatic images of a series of halftone step patterns of different densities on said recording member;

developing the latent images of the series of halftone step patterns;

transferring the developed images of the series of halftone step patterns to a second member; and scanning the record member having the series of halftone step patterns and generating adjustment signals for correcting for conditions in processing of an image, and in response to said adjustment signals producing a second corresponding relationship between the halftone density values of said second set with the density values from the first set.

12. The method of claim 11 and including generating data signals representing a contone pattern from a test pattern generator; and in response to said data signals printing a contone pattern on a record member.

13. The method of claim 12 and wherein said writer includes a plurality of radiation emitting recording elements and in said adjustment step there is generated corrected multibit data signals.

14. The method of claim 13 and including scanning of a contone step pattern by said scanner and in response to said scanning generating corrected exposure clock pulses; and said writer being responsive to said corrected clock pulses for generating corrected enablement times for recording.

15. The apparatus of claim 11 and including:

in response to said first signals generating a third signal representing a halftone pattern number for a superpixel corresponding to a density represented by said first signals; and in response to said third signal generating a fourth signal representing a level of density for recording a pixel in the superpixel.

16. The method of claim 15 and wherein said fourth signal includes multiple bits of data for defining a grey level of each of plural pixels in the superpixel.

17. An electrostatographic reproduction apparatus comprising:

scanner means for scanning an original document to be copied and for generating signals representing a density characteristic of images on said document;

an electrostatic recording member movable in a process direction;

a test pattern generator for generating data signals representing a contone pattern;

writer means, said writer means including a plurality of radiation-emitting recording elements, said writer means being responsive to said signals for modulating charge on said member to form a latent electrostatic image, said writer means also being responsive to signals for recording a contone pattern on the recording member;

means for developing the latent image;

means for transferring a developed image to a record member; and adjustment means responsive to rescanning of the record member by the scanner means for generating adjustment signals for correcting for nonuniformities in a direction transverse to said process direction, said adjustment means generating corrected multibit data signals and including means responsive to scanning of a contone step pattern by said scanner means for generating corrected exposure clock pulses, said adjustment means also including means responsive to scanning of a halftone step tablet by said scanner means for generating adjustment signals to a gamma correction look-up table and said writer means being responsive to said adjustment signals and said corrected clock pulses for generating corrected enablement times for recording by said recording elements.

* * * * *